United States Patent [19]

Carlton et al.

[11] Patent Number: 4,573,489
[45] Date of Patent: Mar. 4, 1986

[54] DUMP VALVE

[75] Inventors: Lewis M. Carlton, Tulsa; Bob L. O'Mary, Claremore; Teddy H. Cruse, Broken Arrow, all of Okla.

[73] Assignee: Murphy Management, Inc., Tulsa, Okla.

[21] Appl. No.: 680,896

[22] Filed: Dec. 12, 1984

Related U.S. Application Data

[63] Continuation-in-part of Ser. No. 586,838, Mar. 6, 1984, Pat. No. 4,505,288.

[51] Int. Cl.⁴ .................. E03B 7/12; F16K 31/145; F16K 33/00
[52] U.S. Cl. .................. 137/59; 137/397; 251/14; 251/61.4
[58] Field of Search .................. 251/14, 61.4, 61.5, 251/63.5, 63.6; 137/397, 398, 59

[56] References Cited

U.S. PATENT DOCUMENTS

| | | | |
|---|---|---|---|
| 737,984 | 9/1903 | White | 251/61.4 |
| 2,431,283 | 11/1947 | Spence | 251/14 |
| 2,737,167 | 3/1956 | Dickey | 251/61.4 |
| 3,048,274 | 8/1962 | Lundeen | 251/61.4 |

*Primary Examiner*—George L. Walton
*Attorney, Agent, or Firm*—William S. Dorman

[57] ABSTRACT

A dump valve for dumping liquid from the bottom of a tank comprising an elongated valve body insertable into the lower end of the tank so that the valve body extends deeply into the tank, the innermost portion of the valve body having an inner port communicating with the interior of the tank, the valve body having a portion extending exterior of the tank when the body is inserted into the tank, the valve body having a central axial bore extending therethrough and communicating with the inner port for directing liquid away from the tank, a drain passage connected to the exterior portion of the valve body and communicating with the axial bore for draining liquid from the tank, a pair of head plates connected to the exterior portion of the valve body, the head plates being connected to each other and forming a diaphragm chamber therebetween, a diaphragm held in sealed clamping engagement between the head plates and dividing the chamber into two separate compartments sealed from each other, an elongated valve stem extending within the axial bore from an inner end adjacent the inner port to an outer end which extends through one of the plates and is connected to the diaphragm, a valve closure element mounted on the inner end of the valve stem and adapted to seat in the inner port to close the same, and a pressure conduit connected to one of the compartments for exerting pressure against the diaphragm to move the stem axially to open the inner port to drain liquid from the tank.

4 Claims, 3 Drawing Figures

DUMP VALVE

CROSS-REFERENCE TO RELATED APPLICATION

This application is a continuation-in-part of application Ser. No. 586,838, filed Mar. 6, 1984, now U.S. Pat. No. 4,505,288, and entitled "Pneumatically Controlled Dump Valve System for Gas Scrubbers". The present invention is directed to the dump valve which is illustrated and described in the aforementioned application.

BACKGROUND OF THE INVENTION

When compressing air or other semi-saturated fluids, it is necessary to remove therefrom as much moisture as possible to avoid over-stressing and damaging the positive displacement pistons of the compressor. Most such equipment operates on an unattended basis, and therefore an automatic and very reliable system must be provided to monitor the liquid condensate level in the gas scrubber to maintain a safe liquid level therein, to avoid overflow of liquid into the compressor cylinders. The present invention has for its major objective to fulfill this need in a practical, reliable and economical manner.

U.S. Pat. No. 3,970,099 discloses a liquid level responsive vent valve for the general purposes of the present invention and this patented vent valve, together with an improvement thereof, is utilized in the present invention. More particularly, a very sensitive small pneumatic signal responsive diaphragm spool valve is utilized in parallel relationship with the float operated vent valve of the prior patent, so that when the latter is opened due to rising of the liquid level in the scrubber a small pneumatic control signal is delivered through the spool valve to a pneumatic control chamber on one side of a relatively large diaphragm of an automatic dump valve which constitutes the invention set forth and claimed herein. This novel dump valve is mounted on the side wall of the scrubber and is provided with an inlet located deeply in the scrubber, to avoid the possibility of freeze-up. The small pneumatic signal sent through the spool valve to the large diaphragm chamber of the dump valve opens the latter and drains condensate from the scrubber to automatically maintain its liquid level within prescribed safe limits.

Another object of the invention is to provide a liquid dump valve of the above type which can be quickly manually operated whenever necessary or desirable.

Other objects and advantages of the invention will become apparent to those skilled in the art during the course of the following detailed description.

DETAILED DESCRIPTION

Figures 1, 2:
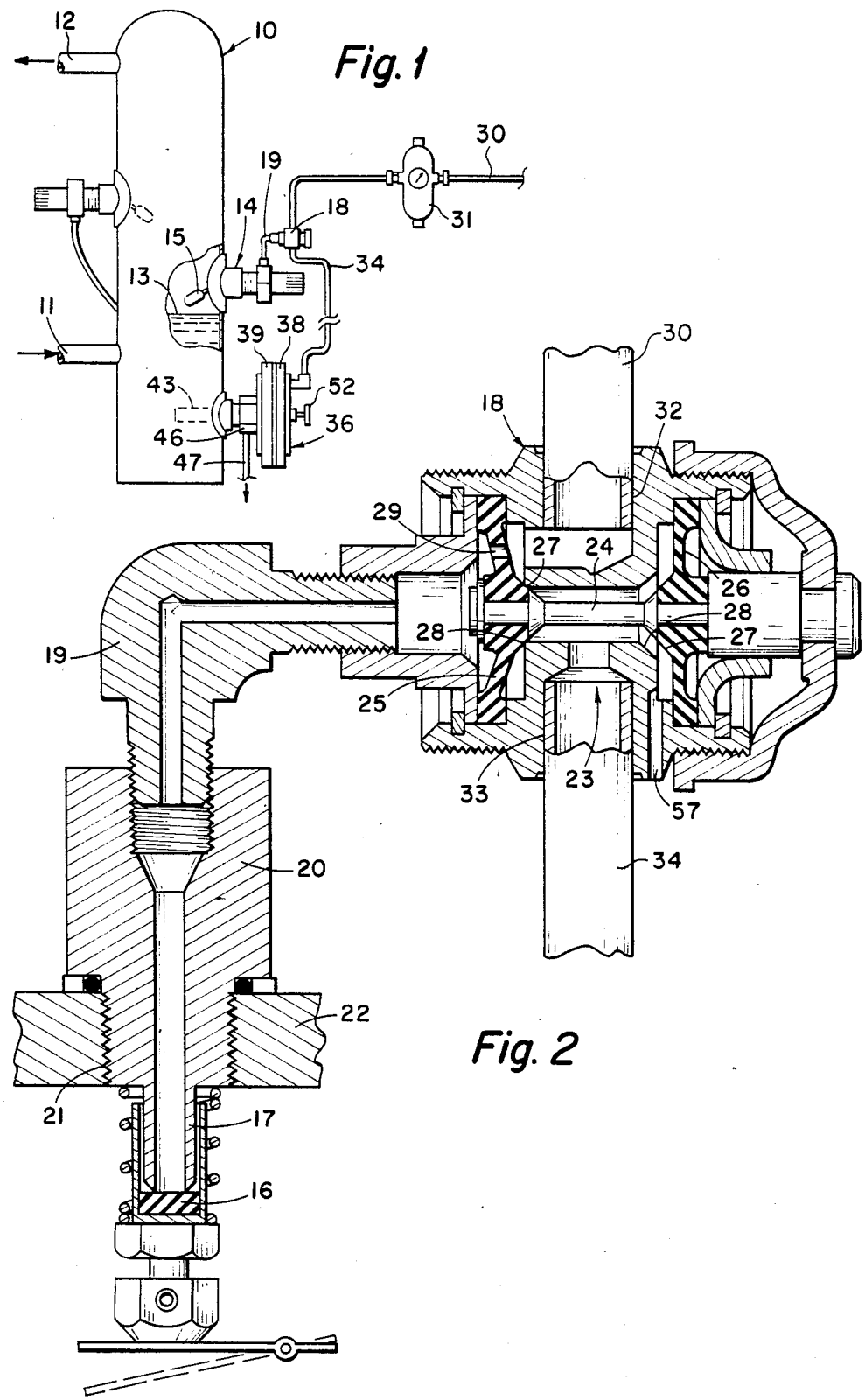
FIG. 1 is a partly schematic view of a liquid level controlled pneumatically operated dump valve system according to the present invention.
FIG. 2 is a cross sectional view taken through a scrubber mounted float operated vent valve of a scrubber and an associated sensitive spool valve.
Figure 3:
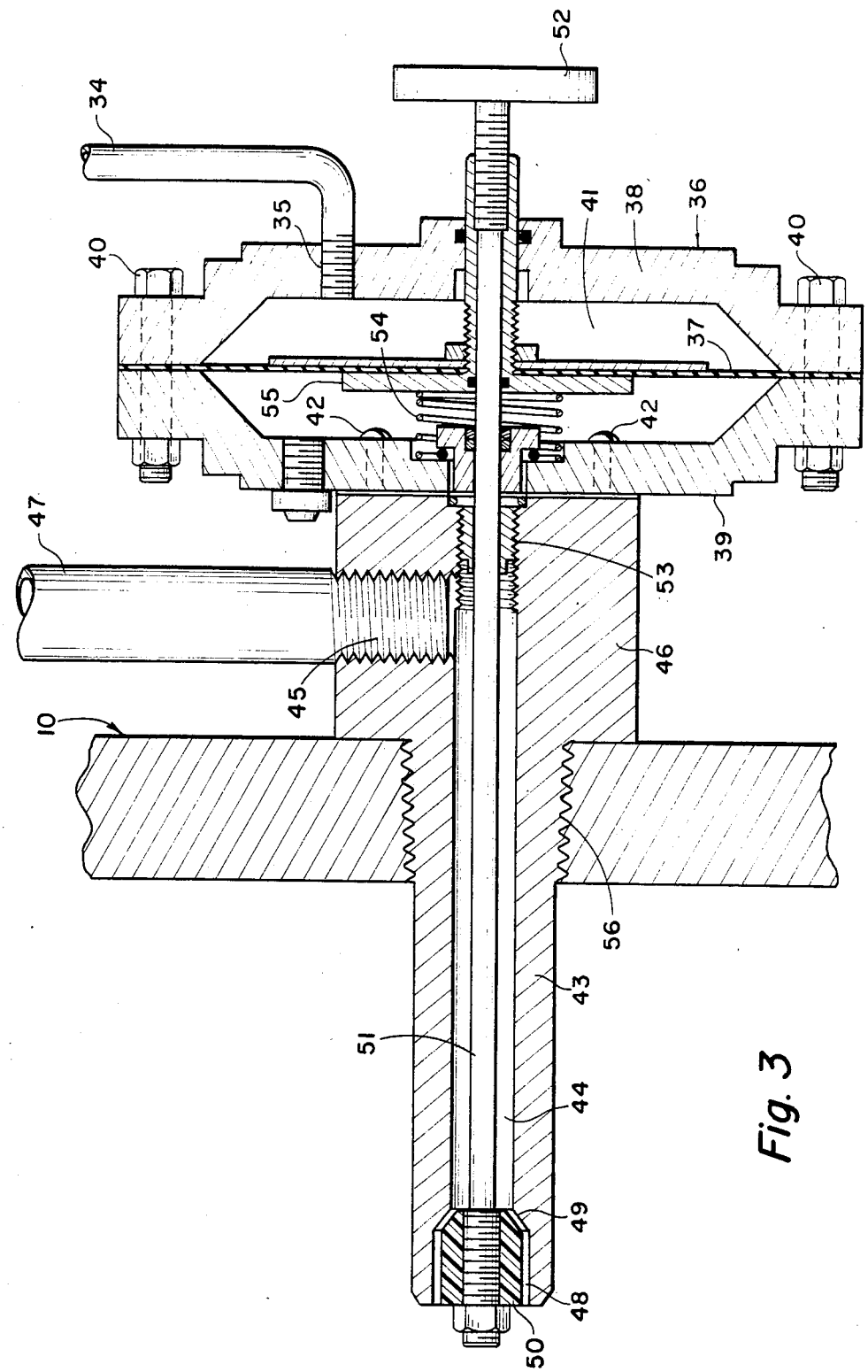
FIG. 3 is a central vertical section taken through the scrubber mounted liquid dump valve of the system.

Referring to the drawings in detail wherein like numerals designate like parts, the numeral 10 designates a typical gas scrubber which receives wet gas near its bottom through an inlet pipe 11 and delivers dry gas to a compressor or the like through an outlet pipe 12 near its top. As the scrubber removes moisture from the wet incoming gas, liquid condensate accumulates at the bottom of the scrubber 10 and the level 13 of this liquid must be held at a safe point in the scrubber to avoid any overflow of liquid into the compressor cylinders which would quickly damage or destroy the compressor pistons.

Toward this end, the liquid level responsive vent valve 14 of U.S. Pat. No. 3,970,099 is employed. As disclosed in this patent, a float 15 projecting into the scrubber through the scrubber side wall senses the rising of the liquid level 13, and at a prescribed safe maximum level the float through a simple mechanical linkage and eccentric cam element effects the unseating and opening of a normally closed vent valve element 16 which engages against the mouth of a venting tube 17 disposed in a dry chamber of the housing of the float operated vent valve in U.S. Pat. No. 3,970,099.

In accordance with the present invention, a sensitive small diaphragm spool valve 18 forming an important element of the system is connected by an elbow fitting 19 to a threaded nipple 20 carrying the venting tube 17 and being coupled within a threaded opening 21 of the wall 22 separating the wet and dry chambers of the patented vent valve.

The sensitive spool valve 18 contains a through passage 23 across the axis of a spool element 24 connected with two diaphragms 25 and 26 each having a center tapered head 27 to engage an opposing conical seat 28. The diaphragm 25 contains a small vent port 29 through which pressurized control air may slowly leak from the line 30 to the venting tube 17.

As shown in FIG. 1, the system further comprises a pneumatic supply line 30 for air at a pressure in the range of 300 psi maximum. A filter/pressure regulator unit 31 is connected in the air supply line 30 between the source of the pressurized air and the inlet 32, FIG. 2, of the through passage 23 of spool valve 18. The outlet 33 of passage 23 is connected by an air line 34 which leads to a control air inlet 35 of a dump valve 36 for liquid condensate in accordance with the invention. The regulated air prressure in the line 30 leading from the unit 31 to the sensitive spool valve 18 is a constant of approximately 20 psi. An atmospheric bleed port 57 connects from the left side of the diaphragm 26 to the atmosphere to permit the elements of the valve 18 to return to the positions shown in FIG. 2 when the venting tube 17 is closed by the valve element 16 and to permit bleeding of pressure from the line 34.

The dump valve 36 forming a very important element of the system includes a relatively large diameter low pressure responsive elastic diaphragm 37 spanning a chamber defined by a pair of head plates 38 and 39 held in sealed clamping engagement with the diaphragm 37 by bolts 40. The diaphragm 37 with the head plate 38 defines a low pressure pneumatic control chamber 41 receiving a low pressure pneumatic signal from the spool valve 18 directly through the line 34.

The head 39 is coupled by screws 42 with an elongated tubular valve body 43 having a central axial bore 44 for liquid leading from the forward end of the body 43 to a liquid dumping or drain passage 45 formed in a head portion 46 of the valve body at its rear end adjacent to the head plate 39. The drain passage 45 can be connected with a suitable liquid drain line 47 or hose leading to any desired disposal point.

The elongated valve body 43 is threaded at 56 for connection in a correspondingly threaded opening in the side wall of scrubber 10 near and above its lower end. The head portion 46, outlet passage 45 and head plates 38 and 39 are all disposed outside of the scrubber 10 and only the long body 43 projects deeply inside of the scrubber to be completely surrounded by the liquid condensate in the lower part of the scrubber. The long penetration of valve body 43 into the scrubber 10 is an important feature of the invention tending to prevent freeze-up of the dump valve by having its liquid inlet well insulated from the cold, deeply inside of the scrubber. At the inner end of the valve body 43, its bore 44 is enlarged at 48 to provide a conical seat 49 for a reciprocatory dump valve closure element 50 formed of Teflon or the like, secured to a long stem 51 extending entirely through the bore 44 and through packing means 53 of the head 46. The valve element 50 is secured by a jam nut 50'.

The same stem 51 bridges the two chambers between the diaphragm 37 and head plates 38 and 39 and projects outwardly of the head plate 38 where it is equipped with a manual operating knob 52.

The stem 51 and valve closure element 50 are biased to a dump valve closing position where the element 50 is seated by a biasing spring 54 disposed between the head plate 39 and a pressure plate 55 acting on the elastic diaphragm 37. This spring yields in response to control air pressure in the chamber 41 to automatically unseat the element 50 which opens the bore 44 to the condensate in the bottom of the scrubber 10 so that the latter can be dumped or drained through passage 45 and line 47. Dumping can be accomplished manually, if desired, by pressing the knob 52 inwardly against force of spring 54 to unseat valve element 50. Following release of the knob 52, or the return of the vent valve element 16 to its normally closed position, the spring 54 will return the element 50 to its closed position, thus terminating the liquid dumping cycle.

The system operation can be summarized as follows. When the liquid level 13 in scrubber 10 at a safe level, the sensing float 15 is not elevated by the liquid and the vent valve element 16 remains in the closed or nonventing position against the end of tube 17. Therefore, the control air delivered through line 30 will be blocked by diaphragm 25 and cannot enter line 34. However, when the liquid level 13 rises sufficiently to raise the float 15 and unseat the valve element 16 from tube 17, the free venting of the control air allows the diaphragm 25 to unseat. At this time, the control air from line 30 passes directly through the passage 23 of spool valve 18 and through the downstream line 34 to the chamber 41 of dump valve 36, to open the dump valve and drain sufficient liquid from the bottom of the scrubber to re-establish a safe level 13 for the liquid. At this time, the float 15 drops and the vent valve element 16 returns to its normally closed position so that venting of the air through the tube 17 ceases. This causes reseating of diaphragm 25, blocking line 34, in turn relieving pressure in the chamber 41 of the dump valve 36, allowing the spring 54 to seat the element 50 and terminate liquid dumping through the valve 36.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A dump valve for dumping liquid from the bottom of a tank comprising an elongated valve body insertble into the lower end of said tank so that said valve body extends deeply into said tank to prevent freezing of the liquid within the valve, the innermost portion of said valve body having an inner port communicating with the interior of said tank, said valve body having a portion extending exterior of said tank when said body is inserted into said tank, said valve body having a central axial bore extending therethrough and communicating with the inner port for directing liquid away from said tank, a drain passage connected to the exterior portion of said valve body and communicating with the axial bore for draining liquid from the tank, a pair of head plates connected to the exterior portion of said valve body, said head plates being connected to each other and forming a diaphragm chamber therebetween, a diaphragm held in sealed clamping engagement between the head plates and dividing the chamber into two separate compartments sealed from each other, an elongated valve stem extending within said axial bore from an inner end adjacent said inner port to an outer end which extends through one of said plates and is connected to said diaphragm, a valve closure element mounted on the inner end of said valve stem and adapted to seat in said inner port to close the same, and a pressure conduit connected to one of said compartments for exerting pressure against said diaphragm to move said stem axially to open said inner port to drain liquid from said tank in response to a liquid level condition.

2. A dump valve as set forth in claim 1 including a biasing spring for urging said stem in a direction tending to hold said valve closure element against said inner port to maintain the same in closed condition.

3. A dump valve as set forth in claim 2 wherein the outer end of said stem is provided with an extension which projects outwardly beyond the other of said head plates, a knob mounted on the end of said extension to permit manual operation of said dump valve against the action of said spring.

4. A dump valve as set forth in claim 3 wherein seals are provided where said stem passes through said head plates.

* * * * *

UNITED STATES PATENT AND TRADEMARK OFFICE
CERTIFICATE OF CORRECTION

PATENT NO.  : 4,573,489

DATED       : March 4, 1986

INVENTOR(S) : Lewis M. Carlton, Bob L. O'Mary, and Teddy H. Cruse

It is certified that error appears in the above-identified patent and that said Letters Patent is hereby corrected as shown below:

On the title page of the patent under Item [75], before "Lewis M. Carlton" insert - - Frank W. Murphy, Jr., Tulsa, - -

Signed and Sealed this

Twenty-ninth Day of July 1986

[SEAL]

Attest:

Attesting Officer

DONALD J. QUIGG

Commissioner of Patents and Trademarks